(12) United States Patent
Song et al.

(10) Patent No.: US 8,552,597 B2
(45) Date of Patent: Oct. 8, 2013

(54) PASSIVE RF ENERGY HARVESTING SCHEME FOR WIRELESS SENSOR

(75) Inventors: Zhen Song, Plainsboro, NJ (US); Chellury R. Sastry, South Brunswick, NJ (US)

(73) Assignee: Siemens Corporation, Iselin, NJ (US)

( * ) Notice: Subject to any disclaimer, the term of this patent is extended or adjusted under 35 U.S.C. 154(b) by 1542 days.

(21) Appl. No.: 11/691,545

(22) Filed: Mar. 27, 2007

(65) Prior Publication Data

US 2012/0256492 A1 Oct. 11, 2012

Related U.S. Application Data

(60) Provisional application No. 60/744,028, filed on Mar. 31, 2006.

(51) Int. Cl.
*H02J 17/00* (2006.01)

(52) U.S. Cl.
USPC .......................................... 307/149; 307/104

(58) Field of Classification Search
USPC .................................................. 307/104, 149
See application file for complete search history.

(56) References Cited

U.S. PATENT DOCUMENTS

| | | | |
|---|---|---|---|
| 2,462,102 A | 2/1949 | Istvan | |
| 2,554,270 A | 5/1951 | Rosenberg | |
| 2,805,332 A | 9/1957 | Bell | |
| 3,327,222 A | 6/1967 | King, Jr | |
| 3,987,448 A * | 10/1976 | Scheppman | .................. 343/702 |
| 3,996,522 A | 12/1976 | Koch et al. | |
| 4,229,742 A | 10/1980 | Rotunda | |
| 5,075,670 A | 12/1991 | Bower et al. | |
| 5,151,848 A | 9/1992 | Finello | |
| 5,585,999 A | 12/1996 | De Long et al. | |
| 6,037,743 A | 3/2000 | White et al. | |
| 6,259,372 B1 | 7/2001 | Taranowski et al. | |
| 6,417,653 B1 | 7/2002 | Massie et al. | |
| 6,691,236 B1 * | 2/2004 | Atkinson | ...................... 713/320 |
| 6,825,754 B1 | 11/2004 | Rolin | |
| 6,856,291 B2 * | 2/2005 | Mickle et al. | ................. 343/701 |
| 6,882,128 B1 | 4/2005 | Rahmel et al. | |

(Continued)

FOREIGN PATENT DOCUMENTS

WO      WO 01 37497 A1      5/2001

OTHER PUBLICATIONS

Pervasive Computing, Published by the IEEE CS and IEEE ComSoc, 1536-1268/05, copyright 2005 IEEE. Energy Scavenging for Mobile and Wireless Electronics, by Joseph A. Paradiso and Thad Starner. pp. 18-27.*

*Primary Examiner* — Fritz M Fleming

(57) ABSTRACT

A radio frequency energy harvester harvests RF energy from the environment. The energy harvester may include a local power source. The energy harvester may have an associated crystal radio antenna that harvests AM radio waves ubiquitously. The radio frequency energy harvested may be stored via a super capacitor. The stored energy may power a self-contained processing unit directly when the level of the energy harvested remains above a threshold level. However, if the energy harvested drops below the threshold level, the processing unit, which may include a radio, may switch to the local power source and/or a low power mode of operation. The low power mode of operation may reduce the amount of processing and/or transmitting by the radio. The processing unit may be part of a network of radios. The energy harvester may supply energy for a variety of applications, including building automation, industrial automation, power generation, and healthcare.

8 Claims, 9 Drawing Sheets

(56) References Cited

U.S. PATENT DOCUMENTS

| | | |
|---|---|---|
| 6,924,772 B2 | 8/2005 | Kiernan, Jr. et al. |
| 7,038,630 B1 | 5/2006 | Bally et al. |
| 7,089,089 B2 | 8/2006 | Cumming et al. |
| 7,132,757 B2 * | 11/2006 | Steigerwald et al. ......... 290/1 R |
| 7,139,239 B2 | 11/2006 | McFarland |
| 2002/0116460 A1 | 8/2002 | Treister et al. |
| 2005/0115600 A1 * | 6/2005 | DeSteese et al. ............. 136/205 |

* cited by examiner

PASSIVE RF ENERGY HARVESTING SCHEME FOR WIRELESS SENSOR

PRIORITY AND CROSS-REFERENCE TO RELATED APPLICATION

This application claims priority under 35 U.S.C. §119(e) to provisional application Ser. No. 60/744,028, filed on Mar. 31, 2006, which is incorporated by reference in its entirety herein.

BACKGROUND

The present embodiments relate generally to harvesting environmental energy. More particularly, the present embodiments relate to harvesting energy from radio frequency (RF) signals to power a sensor node and/or wireless radio.

Wireless sensor networks (WSNs) of so-called "smart" sensors can be used in remote monitoring and control applications. However, in almost all applications that involve WSNs, there is a trade off between the need to sense and communicate useful information and the requirement to do so in an energy efficient manner. A WSN, once deployed, may be intended to work for long periods of time with only minimal human intervention. For instance, remote monitoring applications may include individual sensor nodes, numbering into the hundreds or even thousands, that each run on a limited supply of energy, such as a battery. As a result, with conventional sensor nodes, excessive on-board processing and, perhaps more importantly, frequent invocation of the sensor node's radio may rapidly deplete the on-board energy source. Therefore, there is a need to develop sensor network protocols and algorithms with energy-efficient and self-organizing capabilities.

Additionally, replacing depleted batteries may be inefficient or impractical. A network may include a large number of individual sensor nodes that may be difficult to access due to being implanted within a wall, a ceiling, a larger device, or a patient. Accordingly, there is also a need for novel energy harvesting schemes operable to power wireless sensor nodes, as well as automatically replenish on-board energy storage units.

BRIEF SUMMARY

By way of introduction, the embodiments described below include methods, processes, apparatuses, instructions, or systems for harvesting energy from freely available radio frequency (RF) signals. The energy harvested may power processing units, such as self-contained processing units or sensor nodes. A "passive RF energy harvesting system," or "harvesting system," may be connected to a processing unit having a processor and delivers power supply to the processing unit. Each harvesting system may be associated with a crystal radio receiver and/or an all pass or band pass filter operable to harvest energy from all radio frequency bands simultaneously or ubiquitously. As a result, more of the available RF energy may be harvested from the existing electromagnetic signals. The harvesting is ubiquitous since no tuning is required if the harvester is moved from place to place. Most of the RF energy scavenged may be harvested from amplitude modulated (AM) radio signals. The harvesting system may have a super capacitor that temporarily stores the RF energy captured. If the level of RF energy being harvested falls below a threshold level, an interrupt signal may be generated that directs the processing unit to conserve energy. For instance, the processing unit may limit on-board processing or reduce the number and/or strength of signals transmitted via a wireless radio, or both.

In a first aspect, a method harvests passive radio frequency energy. The method includes harvesting radio frequency energy using a crystal receiver. The method also includes powering a processing unit directly from the radio frequency energy being harvested when the radio frequency energy being harvested or an associated signal is approximately equal to or above a threshold level, and alternatively powering the processing unit from an on-board power source when the radio frequency energy being harvested or the associated signal is below the threshold level.

In a second aspect, a method harvests passive radio frequency energy. The method includes harvesting radio frequency energy via a crystal receiver and storing the radio frequency energy harvested on a super capacitor for subsequent use.

In a third aspect, a system harvests passive radio frequency energy. The system includes a network of radios within a building operable to direct the operation of building equipment to control a building environment of a building and at least one radio within the network being a sensor node operable to harvest radio frequency energy via a crystal receiver, the radio frequency energy harvested being used to power the sensor node.

In a fourth aspect, a computer-readable medium having instructions executable on a computer stored thereon is described. The instructions include monitoring for an interrupt signal that is triggered when the radio frequency energy being harvested via a crystal receiver falls below certain threshold, the radio frequency energy being used to at least partially power a sensor node or charge the battery on the harvesting system. The instructions also include automatically reducing the amount of power being expended by the sensor node if the interrupt signal is detected.

The present invention is defined by the claims herein. Nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components in the figures are not necessarily to scale, emphasis instead being placed upon illustrating the principles of the invention.

DETAILED DESCRIPTION OF THE DRAWINGS AND PRESENTLY PREFERRED EMBODIMENTS

Figure 1:
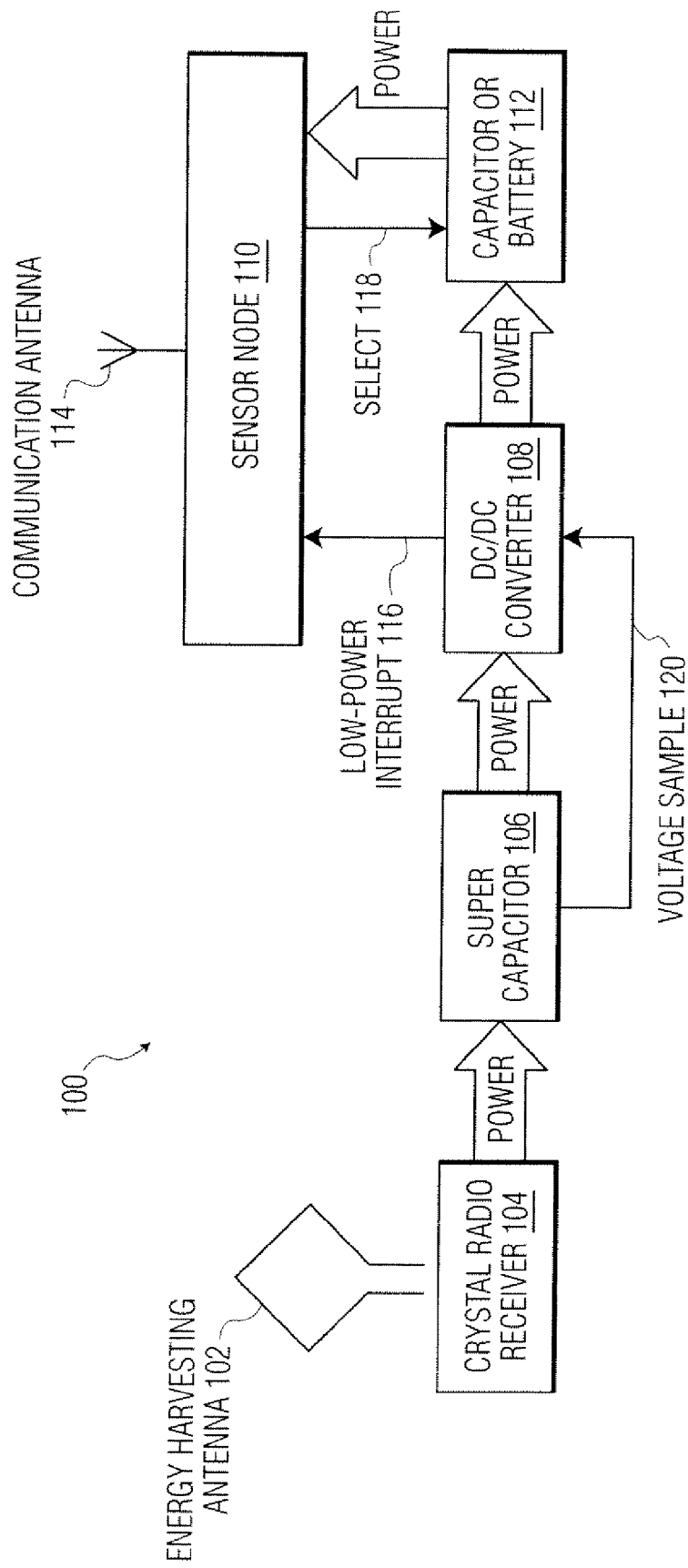
FIGS. 1 and 1a are system block diagrams of an exemplary passive RF energy harvesting systems.

The present embodiments are directed toward methods, processes, apparatuses, instructions, or systems for harvesting freely available radio frequency (RF) energy from the environment, such as signals generated from amplitude modulated (AM) and frequency modulated (FM) radio stations. The RF energy harvested is used to power a "sensor node." The sensor node may include a processor, a sensor, an actuator, a wireless radio, and/or other components. The sensor node may be part of a network of radios in direct or indirect communication with one another, such as a wireless sensor network (WSN).

The sensor node may have an associated crystal radio receiver. The crystal radio receiver may operate as an all pass filter to harvest energy from all radio frequency bands simultaneously or ubiquitously. As such, more of the available RF energy may be captured for the given electromagnetic signals being received by the sensor node at a specific time.

The energy harvesting system may have an associated super capacitor that temporarily stores the RF energy received or a related signal, such as a voltage, a current, or other electrical parameter or signal associated with the RF energy harvested. In one embodiment, if a voltage associated with the RF energy being harvested falls below a given threshold, an interrupt signal may be generated that directs the sensor node to switch to a "low-power" mode to conserve energy. In low-power mode, the sensor node may reduce the amount of processing that an on-board processor performs. Alternatively or additionally, in low-power mode, the operation of an on-board wireless radio or transmitter may be altered and/or limited. For example, the wake-up period of the sensor nodes may be increased for energy saving purposes. Other manners of reduced sensor node operation may be employed to conserve energy being expended by the sensor node.

I. Crystal Radio Receivers

Generally, the embodiments discussed herein provide energy harvesting or scavenging for sensor nodes and/or wireless sensor networks (WSNs). In particular, AM RF signals may be harvested via crystal radio receivers to provide the primary, or even sole, source of power for the sensor nodes. Other crystal receivers may be used.

Crystal radios were popular by the 1950's, but are now almost obsolete. One of the key features of crystal radios is that they do not require batteries. The earplugs and/or speakers of a crystal radio may be powered solely by amplitude modulated (AM) radio signals. The crystal radio may employ a piezo-electric crystal, dielectric disk, oscillating crystal, or another type of crystal. The crystal may oscillate or vibrate due to the radio frequency signals being received. Exemplary crystal radio receivers are disclosed by U.S. Pat. Nos. 2,554, 270, 2,805,332, 3,327,222, and 3,996,522, which are all incorporated herein by reference in their entireties. Other crystal radio receivers may be used.

The crystal radio technology may be used in new applications due to the advancement of semi-conductors and reduced power requirements of sensor nodes. In other words, the available energy that may be harvested from radio frequency signals via a crystal radio receiver, may contain sufficient energy to power milliwatt level instruments and micro-devices. Additionally, the size of a crystal radio antenna may be configured to be relatively small, ranging from a few to tens of centimeters. An antenna of this size may be used with a number of today's wireless sensor node applications.

Harvesting small amounts of energy from radio signals has been studied before, although not in the context of powering nodes in a WSN by AM RF signals. Previous studies have concluded that RF energy is of little utility unless a receiver is very close to a transmitter, such as a cell phone station. An alternate approach would be to introduce an RF signal transmitter for the explicit purpose of transmitting RF energy to a receiver that then harvests the RF energy to perform certain tasks. In other embodiments, such an approach may not be practical in the context of WSNs.

The energy available from RF signals in the unlicensed band, for e.g., the 2.4 GHz spectrum, may be typically too limited to be of any practical use. Such RF power harvesting may be impractical due to (1) very limited power being available (for an antenna size of 100 cm$^2$, the received power may be less than 0.1 milliwatt), and (2) very limited range (not only may a transmitter be required, but the sensor also may have to be placed very close to the transmitter). On the other hand, the principles on which crystal radios operate may finally permit the successful harvesting of energy from freely available RF signals.

As AM radio signals may be strong enough to power an earplug or a speaker, the energy available from RF signals may be more than past estimates indicated. A typical sensor node may require about 20 milliamps in active mode and 5 microamps in sleep mode, and the operating voltage required may be about 3 volts. Thus, the required power for a typical sensor node is comparable to the power that may be harvested via RF signals. Additionally, low-duty low-energy sensors may not require a transmitter, further reducing the amount of energy needed to power the sensor node. Therefore, RF signals may be a viable "free" and persistent (available 24 hours a day) energy source for a considerable amount of a given radio broadcast receiving area.

II. Estimation of Received Radio Energy

Table 1 below illustrates an estimation of the available RF energy in Princeton, N.J. from AM and FM RF signals transmitted by area radio stations. Through this rough estimation analysis, the "free" RF energy in the Princeton area is shown to be within the 10 milliwatt level. The estimation is based upon the Friis propagation model, $$P_r = \frac{p_t G_t G_r \lambda^2}{(4\pi)^2 d^2 L},$$

TABLE 1

Radio Stations that can be Received in Princeton, N.J.

| Call Sign | Frequency | Dist./Signal | City | Format | Estimated Received Energy (w) |
|---|---|---|---|---|---|
| WNJT | 88.1 FM | 7.1 mi. | Trenton, NJ | Public Radio | 2.8 * 10$^{-6}$ |
| WWFM | 89.1 FM | 6.7 mi. | Trenton, NJ | Classical | 3.1 * 10$^{-6}$ |
| WPST | 94.5 RM | 17.7 mi. | Trenton, NJ | Top-40 | 0.40 * 10$^{-6}$ |
| WTHK | 97.5 FM | 12.5 mi. | Burlington, NJ | Classic Rock | 0.75 * 10$^{-6}$ |
| WMGQ | 98.3 FM | 10.7 mi. | New Brunswick, NJ | Adult Contemporary | 1.0 * 10$^{-6}$ |

TABLE 1-continued

Radio Stations that can be Received in Princeton, N.J.

| Call Sign | Frequency | Dist./Signal | City | Format | Estimated Received Energy (w) |
|---|---|---|---|---|---|
| WAWZ | 99.1 FM | 19.3 mi. | Zarephath, NJ | Christian Contemporary | $0.30 * 10^{-6}$ |
| WKXW | 101.5 FM | 7.1 mi. | Trenton, NJ | News/Talk | $2.1 * 10^{-6}$ |
| WPRB | 103.3 FM | 7.2 mi. | Princeton, NJ | College | $2.0 * 10^{-6}$ |
| WWJZ | 640 AM | 24.5 mi. | Mount Holly, NJ | Children's | $9.1 * 10^{-3}$ |
| WFAN | 660 AM | 55.0 mi. | New York, NY | Sports | $1.7 * 10^{-3}$ |
| WOR | 710 AM | 40.4 mi. | New York, NY | Talk | $2.7 * 10^{-3}$ |
| WABC | 770 AM | 46.1 mi. | New York, NY | News/Talk | $1.8 * 10^{-3}$ |
| WCBS | 880 AM | 55.0 mi. | New York, NY | News/Talk | $0.95 * 10^{-3}$ |
| WPHT | 1210 AM | 32.9 mi. | Philadelphia, PA | Talk | $1.4 * 10^{-3}$ |
| WHWH | 1350 AM | 9.5 mi. | Princeton, NJ | Business News | $13.5 * 10^{-3}$ |

Here, $p_t$, $p_r$ are the power of the transmitter and the receiver, respectively; $G_t$, $G_r$ are the antenna gains of the transmitter and the receiver, respectively; $\lambda$ is the wavelength of the RF signal in meters; d is the distance between the transmitter and the receiver; and L is the system losses (L>1). The estimation is based upon various assumptions, such as (1) radio station information (frequency and distance), (2) the transmitting power of AM radio stations being 10 kilowatt and FM stations being 5 kilowatt, (3) the antenna gains, G, are 1 (for a properly designed antenna, G>1), and (4) the system losses, L, are 1.

The results of the estimation indicate that (1) the total power received was 31.120 milliwatts, (2) the AM power received was 31.108 milliwatts, or 99.96% of the total power, and (3) the FM power received was 0.0126 milliwatt, or 0.04% of the total power. The estimation is based on ideal environments. In practice, L is more than 1 and the received power is less than the ideal case. Observing the Friis propagation model reveals that the effect of wavelength on the received power is more than that of the transmission power. Accordingly, signals with longer wavelength, such as AM signals, are much more suitable for RF energy harvesting.

A typical sensor node may require about 41 milliwatts in active mode and 1.5 microwatts in sleep mode. This power requirement is of the same order of magnitude as the power that is available from RF signals. With reasonable conditions, such as the sensor nodes being located near one or more AM radio stations and/or using relatively efficient antennas, the sensor nodes may be powered solely by the AM signal(s) and be kept running uninhibited all of the time. Alternatively, the sensor nodes may be powered primarily by the AM signal(s), if backed up by an on-board energy source.

III. Estimation of Available Energy from Other RF Signal Sources

As noted above, AM signals may include much more energy available for harvesting than FM signals. Energy from other RF signal sources also may be very small when compared with AM signals. For example, the RF signals from cell phones quickly attenuate as a function of distance. As a result, a cell phone signal may be used as a source of energy to power a sensor node only if the distance from the cell phone to the sensor node is about one meter or less.

Energy also may be received from IEEE 802.11.x protocol-based devices and television sets. As IEEE 802.11.x devices operate in the 2.4 GHz band, the energy available for harvesting may be even less than what is available from cell phones. Similarly, due to their high frequency, television signals may contribute very little towards harvestable energy. Therefore, AM signals may provide the best freely available RF source of power for wireless sensor nodes.

IV. Hybrid Scheme

A number of harvesting schemes may be utilized to capture energy from RF signals. As an example, harvesting energy from AM signals may not only be useful for indoor sensor nodes, but could also prove fruitful for outdoor sensor deployments.

In one aspect, the RF harvesting schemes discussed herein may combine two concepts. A sensor node may include crystal radio technology that is operable in conjunction with an energy storage unit, such as a battery and/or a capacitor. Once the output of the crystal radio receiver is connected to act as a source of energy and/or a "charger" to the energy storage unit, the system may be ready for use.

The sensor node may include a RF energy harvesting device that includes a so-called "energy harvesting antenna" operable to capture RF energy. The antenna may harvest AM, as well as FM, or RF signals. The antenna may be a spider antenna, braided antenna, omni-directional antenna, double-braided polyester rope, loop antenna, air coil loop antenna, sparrow antenna, Yagi-Uda antenna, or other type of antenna.

Figure 8:
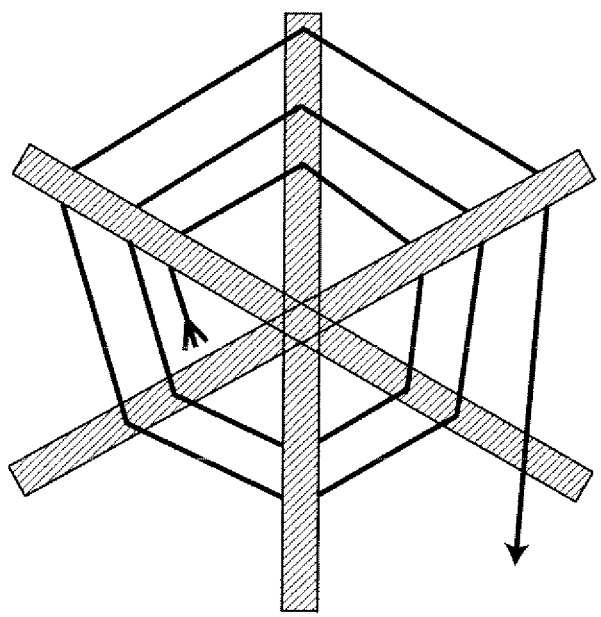
FIGS. 8 and 9 illustrate exemplary antennas.
Figure 9:
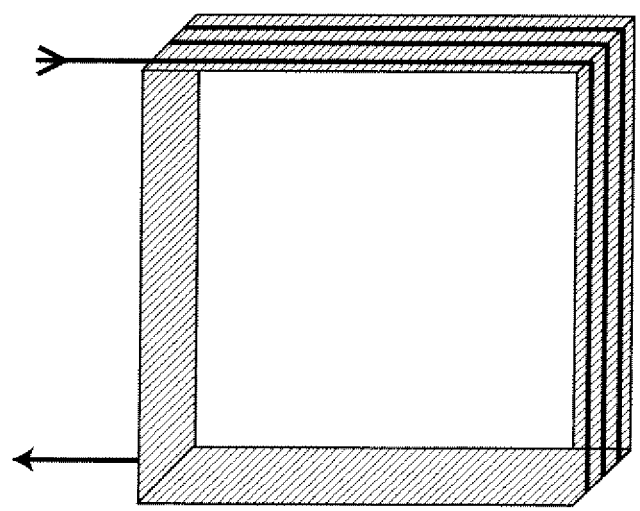

For example, FIG. 8 is an exemplary spider antenna. As shown, the antenna may have a number of legs of differing size. FIG. 9 is another exemplary antenna. Other shapes may be used, such as circular or disk shapes.

The antenna may be a laminated antenna having a number of wires etched onto a semi-conductor or other micro-device. The antenna wires may have either a flat or rounded shape, or be disk shaped. The antenna may have a number of spokes or legs, such as the spider antenna disclosed by U.S. Pat. No. 4,229,742, or the antenna may be a grid antenna similar to the one disclosed by U.S. Pat. No. 7,038,630, both of which are incorporated herein by reference in their entireties. As the antenna characteristics may be determined based upon the bandwidth and gain properties desired for a specific application, alternative antennas may be used.

In one embodiment, for both convenience and cost reduction purposes, a 1950's type of coil or wire antenna connected to the crystal radio receiver may be replaced by modern flexible printed circuit board. Printed circuit board similar to that used in conventional radio frequency identification (RFID) devices may be used. An exemplary RFID antenna is disclosed by U.S. Pat. No. 6,825,754, which is incorporated herein by reference in its entirety. Other types of printed circuit board material and shapes may be used as the antenna.

Figure 2:
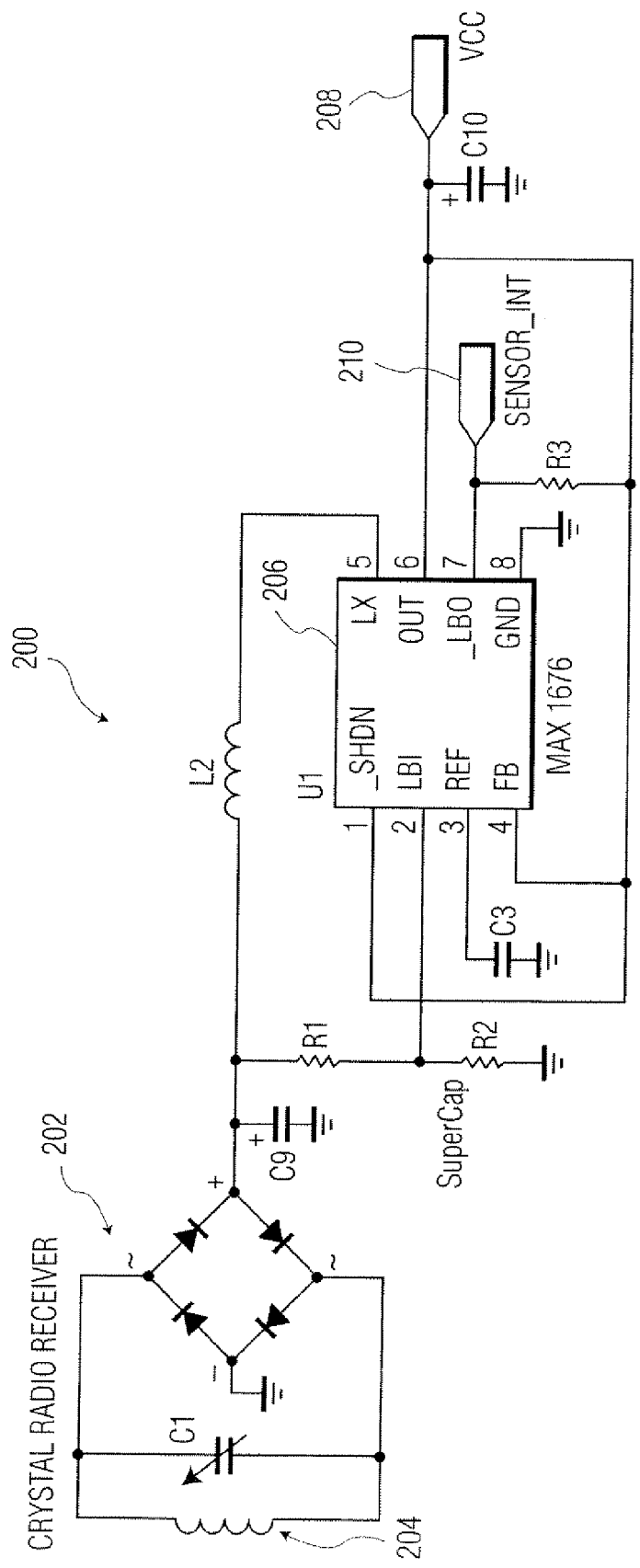
FIGS. 2 and 2a are schematics of additional exemplary passive RF energy harvesting systems.

Once the RF energy is scavenged, the sensor node may regulate the energy within the crystal radio circuit and convert the RF signals received to a DC signal, such as via a rectifier, without any frequency filtering. As an example, the RF signals harvested may not be filtered via low, high, or band pass filters. After the RF energy harvested passes through the rectifier, the energy may be stored on a super capacitor. However, since the voltage on the two sides of the super capacitor may not satisfy the requirements of the sensor node, a DC/DC converter and/or another capacitor may be employed (such as shown in FIG. 2, discussed below).

Clean DC power may be available on both sides of the second capacitor. In addition, the DC/DC converter may sample the voltage on the super capacitor, and issue an interrupt to the sensor node once the voltage, which is an indication of the energy being stored and/or harvested, is lower than a certain threshold. The sensor node may then switch to the on-board power source of the harvesting system, such as a battery, a capacitor, or other energy storage device. If the energy being harvested provides a voltage level greater than that of an on-board energy storage device, the energy being harvested may power the sensor node directly, as well as provide a trickle charge to the on-board energy storage device. On the other hand, if the energy being harvested provides a voltage level lower than of the on-board energy storage device, the on-board energy storage device may provide power to the sensor node via a trickle discharge. The harvested RF energy is used to charge the battery under this case.

Therefore, the wireless and self-contained sensor nodes may employ a "hybrid" RF energy harvesting scheme. Each wireless and self-contained sensor node may be equipped with (1) a RE-based energy harvester and (2) an on-board power source. As long as there is enough available power from the RF energy harvester, the sensor node may operate using the RF power. Intermittently, however, the power from the harvester may not be at the threshold required to operate the sensor node. As a result, an interrupt may be generated that switches the sensor node to the on-board power source. The hybrid scheme ensures that the sensor node may be continuously operational while simultaneously greatly lengthening the life-time of the on-board power source.

There are some distinctions between RF energy harvesting as discussed herein and conventional harvesting schemes. With respect to solar cell techniques, the proposed RF harvesting schemes are not affected by the weather or time of day (darkness). The proposed RF harvesting schemes may provide a continuous power supply as most radio stations broadcast around the clock.

Additionally, the proposed RF harvesting schemes may provide more power than solar cells, such as with indoor environments, and at less cost, as typical solar cells may be more expensive than an RF antenna or coil. The costs associated with the proposed schemes may be further reduced if the antenna is implemented using technology similar to that of a RFID tag.

As compared to biomechanics-based harvesting schemes, the proposed RF harvesting schemes may be more suitable for sensor node applications. Conventional biomechanics harvesting methods tend to provide energy on an inconsistent basis and inconveniently toggle sensors periodically to recharge the power source. On the other hand, the proposed RF harvesting schemes may provide a consistent milliwatt-level power source. Toggling may be used with RF harvesting.

With respect to vibration or thermoelectric methods, it may be more difficult to find a vibration or heat source than it is to locate an AM radio station, especially in populated regions of the United States. When a free source is not available, the vibration or thermoelectric based schemes may require an artificial source. In many environments, such as an office or building, installation of such artificial energy sources may not be feasible.

In sum, new RF energy harvesting schemes are described that provide energy to self-contained sensor nodes. The schemes provide an improved crystal radio receiver and harvest AM RF signals as a source of power. The RF harvesting schemes are suitable for indoor applications that involve wireless sensor networks, such as building automation applications.

The RF harvesting schemes may be especially useful in areas having AM stations within about 20 kilometers to satisfy typical sensor node power requirements. However, the effective distance of the harvesting schemes may be extended. The antennas employed may be configured to harvest more energy and provide enhanced gain. Sensor nodes may be configured to be more energy efficient. For example, the sensor nodes may be programmed to operate more efficiently, such as spending more time in various reduced power modes of operation. Additionally, the sensor nodes equipped with RF energy harvesters may be supplemented with other types of energy harvesters, such as solar, piezo-electric, MEMS (micro-electro-mechanical systems), biomechanical, thermoelectric, and other harvesters. The RF harvesting schemes, except for requiring relatively nearby AM radio stations, may have no other substantial apparent limitations, such as the weather, periodic toggling, or other limits.

V. Exemplary RF Energy Harvesting Systems

FIG. 1 illustrates an exemplary passive RF energy harvesting system 100. The system 100 may include an energy harvesting antenna 102, a crystal radio receiver 104, a super capacitor 106, a DC/DC converter 108, a sensor node 110, a local power source 112, and/or a communication antenna 114. The system may include additional, fewer, or alternate components.

The crystal radio receiver 104 or crystal set may employ an antenna 102. The crystal radio receiver 104 may not require a battery or power source except the power received from radio waves via the antenna 102. The crystal radio receiver 104 may include an antenna wire, a tuning coil of copper wire, a rectifier, and other components. The crystal radio receiver 104 may be a passive radio receiver, not requiring an actively powered amplifier associated with conventional radios. The crystal radio receiver 104 may preserve electrical power from RF signals received via the antenna 102 and convert the RF signals to electronic power. The crystal radio receiver 104 may include various types of antennas and various "low-tech" or traditional electrical circuitry components, such as capacitors, resistors, inductors, and diodes. As such the crystal radio receiver 104 may be simpler and less expensive to manufacture than current "smart" radios, such as cellular phones.

The antenna 102 may be a conventional crystal radio antenna and include copper or silver wire coils, or a ferrite coil. The antenna 102 may be a Yagi, log-periodic, fiberglass, cable, repeater, or other type of antenna, including those discussed elsewhere herein. The antenna 102 may be manufactured from printed circuit board, aluminum, copper, silver, other metals, or other materials. The antenna may omni-directionally collect all of the available AM radio signals currently being received. The shape, size, circumference, and composition of the antenna 102 may be altered for a specific application and/or to enhance the gain associated with the antenna 102.

The antenna 102 and crystal radio receiver 104 may act independently or in conjunction to harvest RF energy ubiquitously. The crystal radio receiver 104 may require no tuning and resonant with all of the available frequencies. As a result, energy may be collected simultaneously from a number of radio stations, which may increase the average level of RF energy being harvested. This may be in contrast with typical receivers that may employ RC resonant circuits, which eliminate some RF signals from being harvested. In one embodiment, the antenna may have a physical length of between 10 and 20 cm.

The low power mode may include a number of algorithms and/or software instructions stored in the sensor node that direct the sensor node or an associated processor to conserve or reduce the amount of energy that the sensor node is using. A processing unit on the sensor node may perform reduced or limited processing in low power mode. The radio may change the message routing being employed based upon the amount of RF energy being sensed or harvested. A transmitter may transmit less often in low power mode, or not at all until the level of the RF energy being harvested returns to above a threshold or self-sustaining level. The transmitter may alter the type of signal being transmitted in low power mode. For example, the sensor node may not relay all the received communication packets, and/or the transmitter on the sensor node may transmit at a reduced power level. The transmission at a reduced power level may be intended to only reach the next or closest available sensor node or radio within the network.

The low power mode may include buffering or storing data, instead of constant or even intermittent transmission of information to other sensor nodes. With typical sensor nodes, the operation of the radio and/or transmitting information may require a substantial amount of energy. Therefore, reducing radio transmissions in low power mode may enhance the effectiveness of the RF harvesting schemes discussed herein.

The super capacitor 106 may store the RF energy being harvested. The capacitance of an electrode associated with the super capacitor 106 may be several hundred times the capacitance of a conventional double-layer capacitor. The super capacitor 106 may have one or more electrodes manufactured from titanium, palladium, aluminum, silicon, or other metals. Alternatively, the electrodes may be doped or have titanium, palladium, aluminum, silicon, or other metal coatings. The super capacitor 106 may be similar to those disclosed by U.S. Pat. Nos. 5,585,999 and 5,151,848, which are incorporated herein by reference in their entireties. Alternate types of super or other capacitors may be used.

The DC-to-DC converter 108 may operate to produce an output voltage signal and/or an interrupt signal 116 based upon a signal received from the super capacitor 106 or an electrical parameter of the super capacitor 106 monitored, such as a voltage, current, or other signal. The DC-to-DC converter 108 may be similar to the DC-to-DC converter disclosed by U.S. Pat. No. 6,417,653, which is incorporated herein by reference in its entirety. Alternate DC-to-DC converters may be used.

In one embodiment, the DC-to-DC converter 108 samples the voltage 120 on the super capacitor 106. The voltage sampled may be a reflection the current level of RF energy being harvested crystal radio receiver 104 and/or stored by the super capacitor 106. If the voltage sampled falls below a threshold level, such as a level required by the sensor node 110 to operate normally (i.e., with no power operating restrictions), then the DC-to-DC converter may generate a low-power interrupt 116 signal. The sensor node 110 may switch to a low or reduced power operating mode upon the receipt of the low-power interrupt 116.

The on-board energy storage unit may be a capacitor or battery 112. The on-board energy storage unit 112 may be on a trickle charge when the voltage sampled 120 from the super capacitor 106 remains above the threshold level (such as the actual battery or capacitor voltage) with the carryover RF energy harvested directly powering the sensor node 110. Alternatively, the RF energy harvested may be sent directly from the DC-to-DC converter 108 to the sensor node 110 when the level of RF energy being harvested remains at or above the threshold level.

On the other hand, if the low-power interrupt 116 is sent to the sensor node 110, the sensor node 110 may select 118 or switch to the on-board storage unit 112 as a direct source of power. Alternatively, when the voltage from the DC-to-DC converter falls below the threshold level (such as the actual capacitor or battery voltage), the sensor node 110 may automatically start to be powered by the on-board power storage unit 112 as the storage unit voltage would be higher than the output voltage of the DC-to-DC converter, as can be envisioned by FIG. 1. Other manners of powering of the sensor node from the super capacitor, either solely or in conjunction with the storage unit, may be used.

The sensor node 110 may be mounted on a device that includes the other components shown in FIG. 1 or be associated with the other components in another fashion. The sensor node 110 may include a communication antenna 114 that provides for wireless communication with other sensor nodes. The sensor node 110 may include the components shown in FIG. 4 and discussed below, in addition to the components illustrated by FIG. 1. The sensor node may include additional, fewer, or alternate components.

Figure 1A:
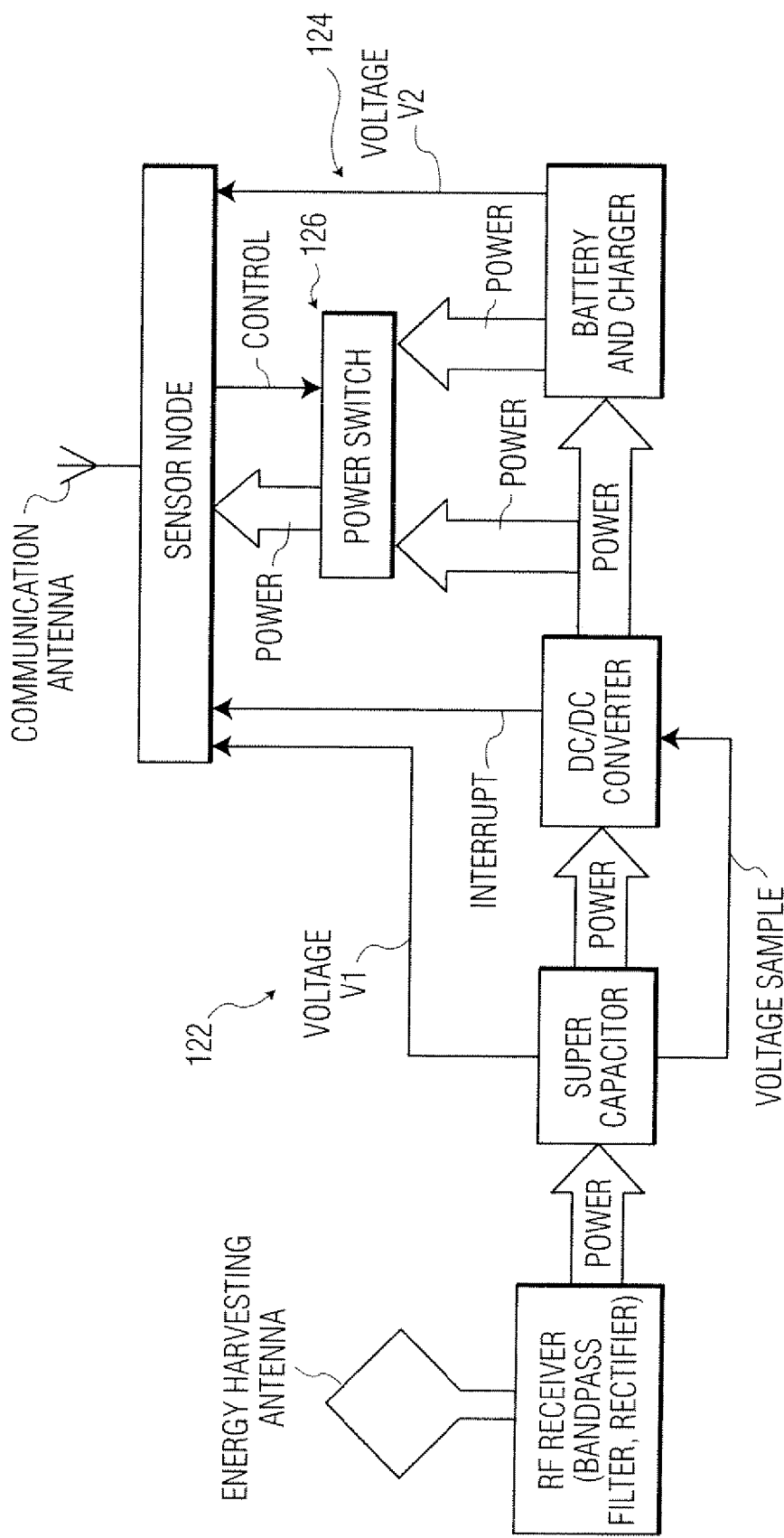

FIG. 1a illustrates another exemplary passive RF energy harvesting system 100. In one embodiment, the system may be targeted to facilitate the powering of sensor nodes in an ad-hoc wireless sensor network. As each sensor node may have communication functionality through an on-board RF module, a message communication subsystem may not be required to be a part of the RF energy harvesting system 100. Also, the RF energy harvesting system 100 may be purely passive, and thus, no registration with the FCC is required.

As shown in FIG. 1a, the system 100 may be connected to the sensor node and its communication antenna. The system 100 may be a band pass and/or all pass filter to match all AM frequencies in order to provide ubiquitous energy harvesting capability and also to harness the maximum available harvestable energy.

As shown in FIG. 1a, a super capacitor is introduced as an energy buffer to the rechargeable batteries. Super capacitors have large number of recharge cycles, but limited energy capacity when compared to rechargeable batteries. In one embodiment, since there is bound to be some variation of RF signal strength from time to time and place to place, the harvested RF energy may not be consistent. Thus, as can be seen from FIGS. 1 and 1a, harvested energy can be used to power the sensor node or charge the on-hoard power source (such as batteries) on each sensor node. Thus, the demands on recharge cycles of the batteries are relaxed and the battery lifetime may be improved.

Figure 7:
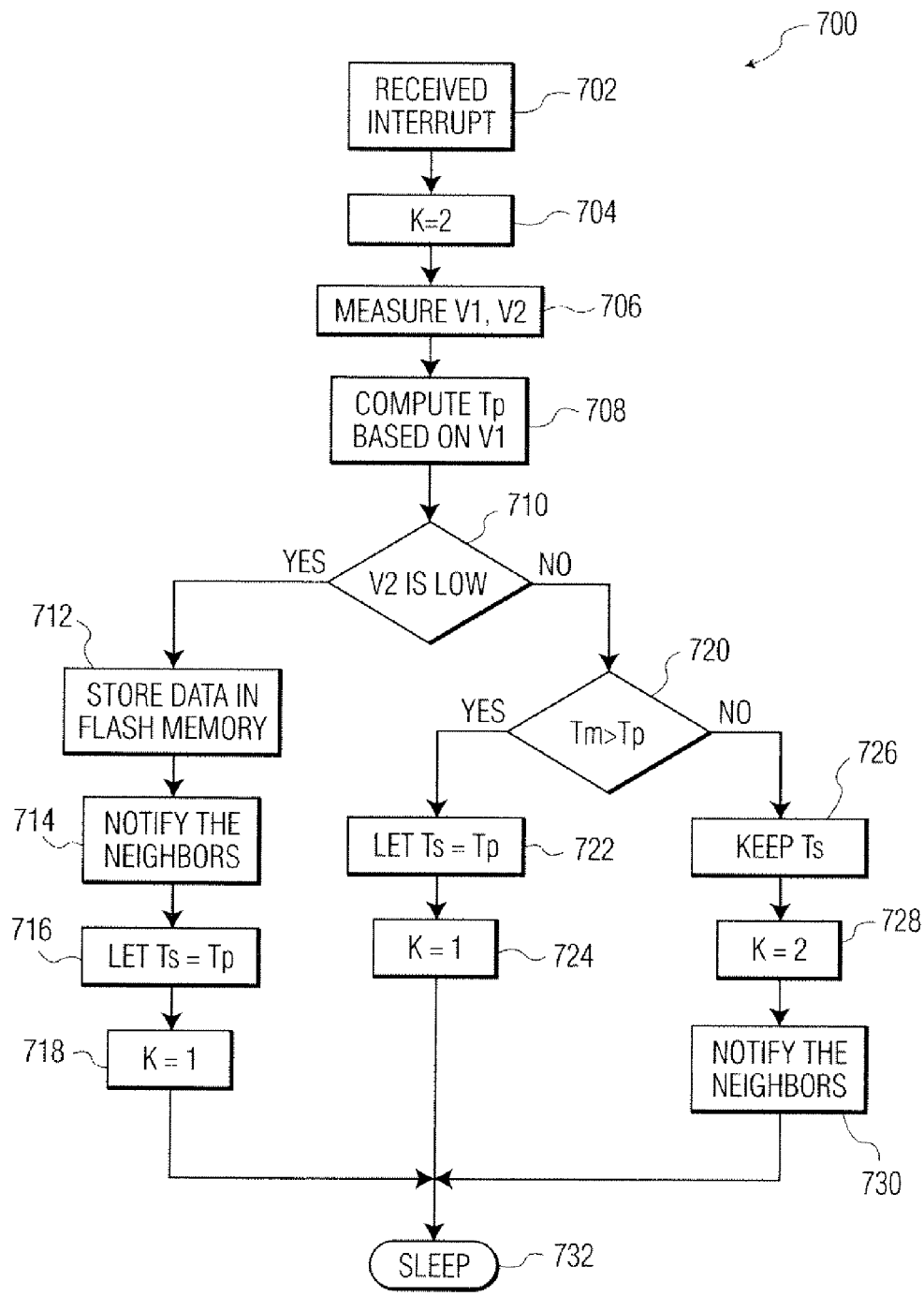
FIG. 7 illustrates an exemplary interrupt handling method.

FIG. 1a also illustrates the interrupt signal. If the harvested RF energy is not enough and falls below a certain threshold, the DC/DC converter (for example, a MAX1674/MAX1675) may trigger the sensor node via an interrupt signal as shown. The processor on the sensor node, upon receiving this interrupt, may measure the voltages of the super capacitor, V1 122, and that of the battery, V2 124. Depending upon what these measured values are, the sensor node may make intelligent decisions. In one embodiment, the sensor node controls a power switch 126 that is operable to switch between the super capacitor and the batteries as a source of power. An exemplary flow chart of an interrupt handling process that may be implemented by software on the sensor node is illustrated by FIG. 7.

FIG. 2 illustrates the circuit exemplary passive RF energy harvesting system 200. The system 200 may include a crystal radio receiver 202, an energy harvesting antenna 204, a DC/DC converter 206, a voltage output 208, and an interrupt output 210. The system may include additional, fewer, or alternate components.

As shown in FIG. 2, the crystal radio receiver 202 may include a capacitor bank and a rectifier that converts the RF energy being received into a DC signal. The DC signal harvested may be stored upon the super capacitor C9. The DC/DC converter 206 may sense the voltage on the super capacitor C9 and provide an output voltage VCC 210 to the sensor node, as well as the sensor interrupt 210 when the output voltage approximately reaches or falls below a threshold level. The sensor nodes may use RF energy harvesting systems having additional, fewer, or alternate components.

Figure 2A:
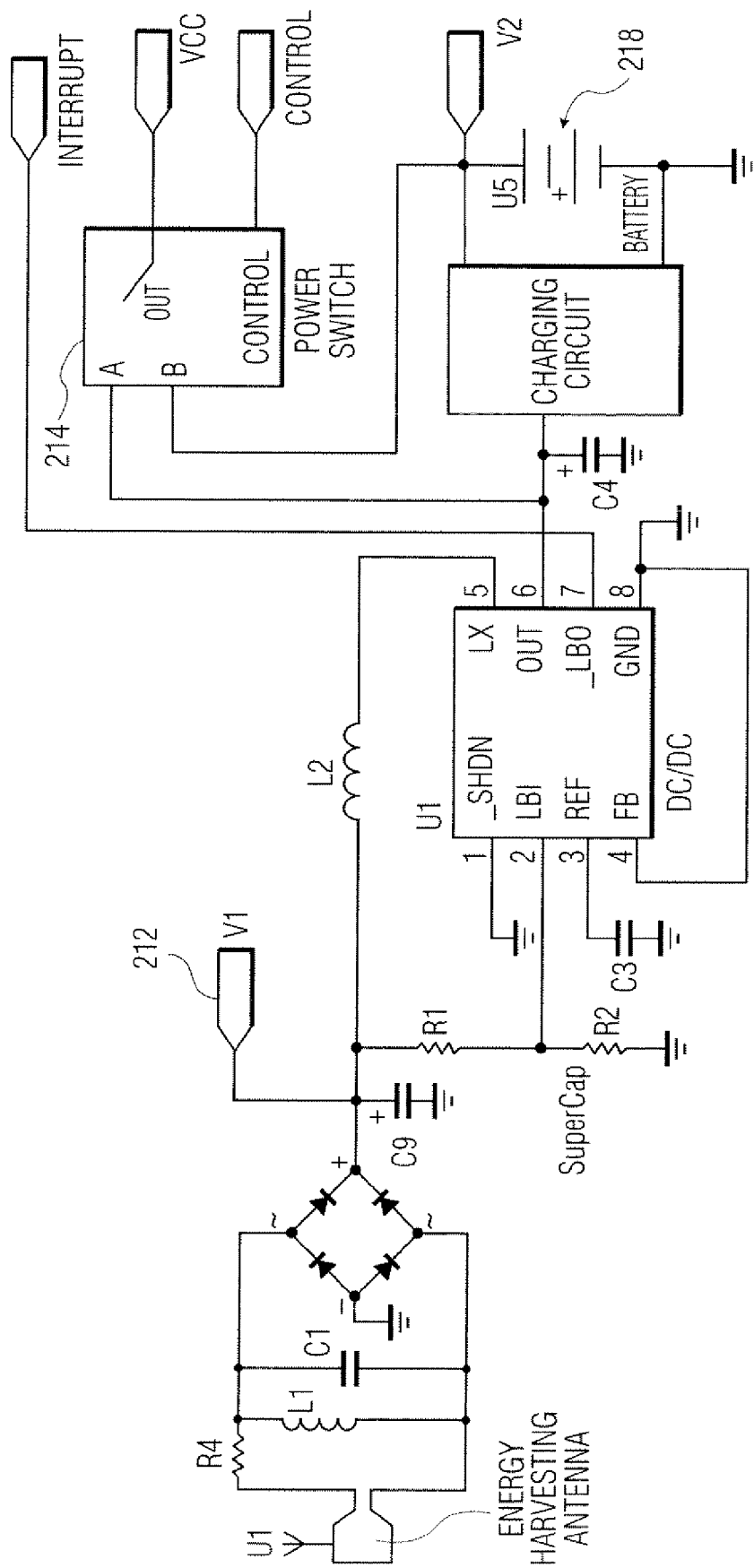

FIG. 2a illustrates another embodiment of the circuit of the exemplary passive RF energy harvesting system 200. With respect to FIG. 1a, FIG. 2a illustrates in more detail from where V1 212 and V2 218 may be sensed. V1 212 may be sensed from the super capacitor C2. V2 218 may be sensed from the battery. FIG. 2a also shows the power switch 214. The system may include additional, fewer, or alternate components.

VI. Exemplary Network

Figure 3:
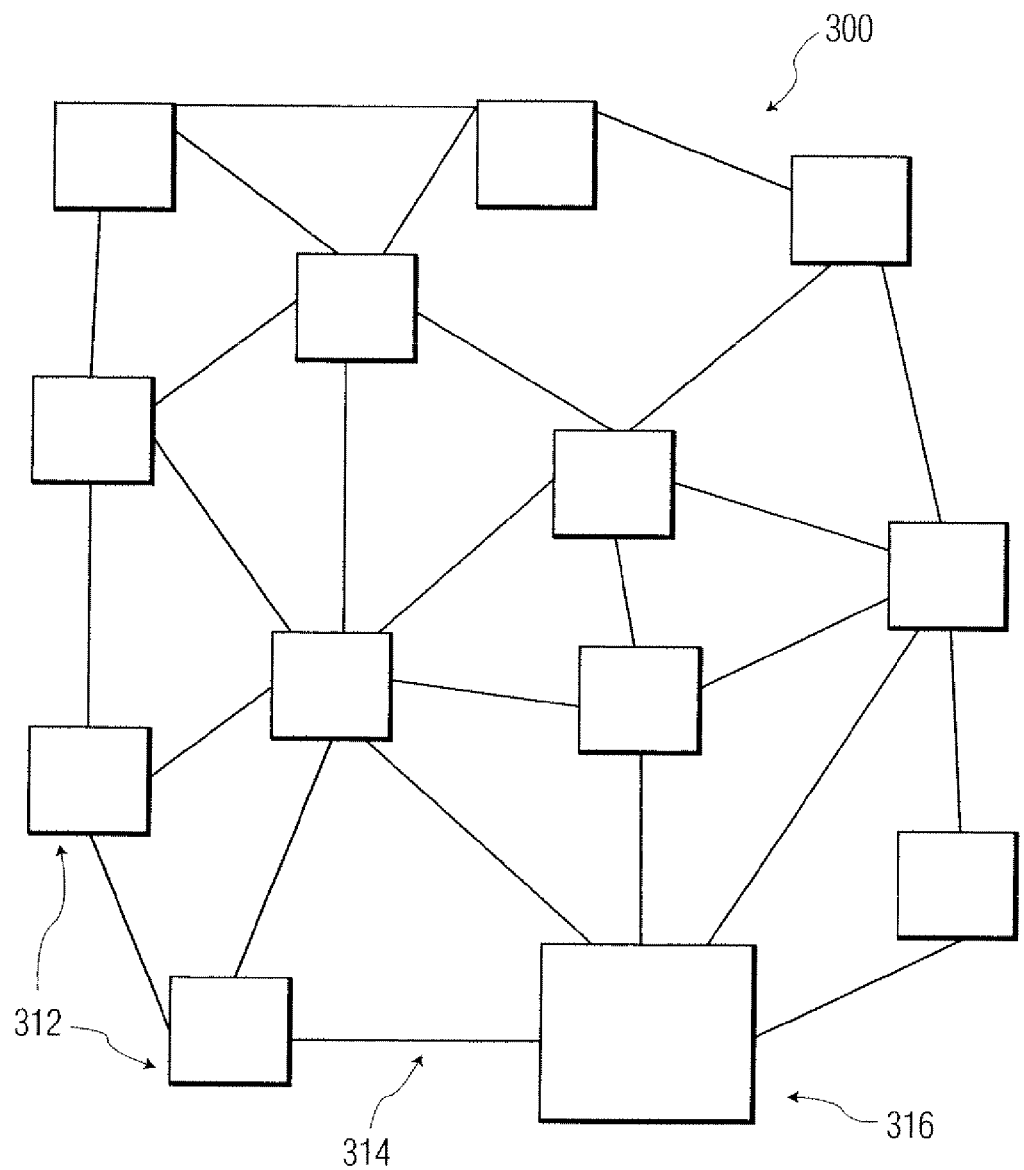
FIG. 3 is a schematic of an exemplary network of sensor nodes.

FIG. 3 illustrates an exemplary network 300 of wireless radios or sensor nodes 312. The network 300 may utilize a dynamic routing algorithm that permits data transmitted to travel the shortest distance or link 314 between sensor nodes 312 to a destination, which decreases the required transmission time for a given message, as well as the required power level of that transmission. The destination may be another sensor node 312 or a control radio 316. Each wireless and self-contained sensor node 312 and control radio 316 may have a dedicated processor, a receiver, and a transmitter. The network 300 may include additional, fewer, or alternate components.

Each sensor node 312 may communicate its associated routing information to every nearby or adjacent sensor node 312 or control radio 316. After a sensor node 312 receives a data transmission, a processor of the sensor node 312 may determine what to do with that data, including whether to retransmit the data to an adjacent or nearby sensor node 312 or control radio 316. The base station 316 may function as a network controller that directs the overall operation of the network 300.

The network 300 may provide continuous communication with otherwise unavailable sensor nodes 312. For instance, some sensor nodes 312 may become obstructed by obstacles, such as equipment, containers, furniture, or other items, or may fail. However, the network 300 may reconfigure itself around blocked paths by redirecting transmissions from one sensor node to the next until communication with a lost sensor node is re-established. The network 300 also may provide enhanced communication reliability between sensor nodes 312 as a single sensor node 312 may be in direct communication with a number of other sensor nodes 312, as shown in FIG. 3.

The network 300 may implement IEEE 802.15.4 protocols. Other protocol standards may be used. The network 300 may operate as a mesh network, as described in more detail below. Alternate control or routing algorithms/instructions may be used.

VII. Control of Building Equipment

One application of the sensor nodes described herein relates to a network that controls building equipment. The network may include multiple sensor nodes, each having a wireless radio, as well as one or more control radios or base stations that direct the network. Each sensor node may be a so-called "smart" sensor node that includes a receiver, a transmitter, a processor, memory, one or more sensors, an actuator, and/or other components. Each sensor node may transmit messages to a control radio acting as network controller. Alternatively, the network controller may be a dedicated processor. The network may have one or more network controllers and/or control radios. The term network herein may include the entire network, a sub-set of a network, a number of sensor nodes, one or more network controllers, one or more control radios, or a combination of sensor nodes with one or more network controllers or control radios.

A network controller may assimilate and analyze a number of messages received from a plurality of sensor nodes. In response to each of the messages received, the network controller may determine that a change in the currently operating building equipment, or the operating modes thereof, is in order. Subsequently, the network controller may transmit a message to one or more sensor nodes that direct the operation of building equipment. Upon receiving the message, a sensor node may alter the operation of building equipment.

The sensors associated with the sensor nodes/wireless radios may monitor specific parameters pertaining to building environmental conditions or specific operating equipment. The actuators associated with the sensor nodes may control the operation of certain building equipment. A sensor node may transmit the value of a parameter sensed by a sensor to the network. In response to the values of the parameters received, the network or another sensor node may automatically alter the operation of building equipment, such as by sending messages that operate the actuators that control the building equipment.

For example, the sensors may be temperature sensors that sense the temperature in an area of a building. Each temperature sensor may be connected with a sensor node having a wireless radio, the sensor nodes being dispersed throughout a building. Each sensor node having a temperature sensor may transmit a message to the network regarding the temperature sensed in the building area in which the sensor node is located. In response to the temperature information received, the network may direct that cooling, heating, ventilation, HVAC, emergency, or other building equipment be operated to alter the building environment of the building area in which the sensor node is located.

The network may employ multiple sensor nodes in each building area to monitor temperature. Conventional wall mourned temperature sensors and/or thermostats may be single point sources of information. However, the average value of individual temperature parameters received from a plurality of temperature sensors dispersed in a given building area may better reflect the actual temperature in the building area. Accordingly, the building environmental equipment may be directed to maintain the temperature of a building area closer to the desired temperature based upon the more accurate temperature information received.

The sensors also may be motion sensors that sense motion in a building area. Each motion sensor may be connected with a sensor node having a wireless radio, the sensor nodes being dispersed throughout a building. Each sensor node having a motion sensor may transmit a message to the network regarding the motion sensed in a building area. In response to the motion information received, the network may direct the operation of building equipment.

The motion detected may alert the network that a building area has recently become occupied or unoccupied. In response, the network may ensure that lighting equipment provides adequate light in or near the building area in which motion was sensed. The network may direct that building environmental equipment, such as cooling, heating, ventilation, HVAC, or other equipment, be operated to alter the building environment of the building area. The motion information received also may be used by the network to determine that a security breach has occurred. Accordingly, the network may trigger an alarm, secure passageways, and operate other security equipment in response to the security breach.

A sensor node having a wireless radio may be connected with an identification device located on an individual. After the sensor node located on the identification device transmits a message to the network, the network may determine the identification and/or location of the associated individual. In response, the network may transmit instructions to building environmental equipment to automatically alter the environmental conditions of the specific building area in which the individual is currently located based upon stored or transmitted environmental preferences associated with that individual.

In a building having numerous pieces of operating equipment, it may be desirable to automatically monitor various parameters associated with various pieces of equipment. For instance, in a power plant, refinery, factory, or other plant, it may be advantageous to monitor temperatures, pressures, alarms, tank levels, bilge levels, hydraulic levels, atmospheric conditions, operating pumps or fans, and other parameters. The change in various temperatures, pressures, levels, or equipment operating temperatures may indicate problematic conditions.

The network may automatically identify problematic conditions associated with operating building equipment. The various parameters monitored each may be sensed by a sensor located on a sensor node. The sensor node having a wireless radio may transmit the value of the parameter to the network, either periodically or upon being queried by the network or sensing an out of specification value. The sensor node may determine whether a parameter is within specification, i.e., a predetermined satisfactory range.

If a parameter is not within specification, the network may take corrective action to restore the parameter and/or building conditions to specification. For example, the running speed of a problematic piece of equipment may be shifted, increased, or decreased. The problematic piece of equipment also may be secured and an alternate piece of equipment may be started or placed on line to replace it. Additional, fewer, or alternate courses of action may be taken to correct problematic or out of specification parameters. Sensor nodes may be connected with or part of the equipment being controlled for wireless control of the equipment.

VIII. Mesh Network

In one embodiment, the network may include a number of sensor nodes, each having a wireless radio, arranged as a mesh network that also may be used to locate movable assets and/or operate building environmental equipment. The mesh network provides the capability of routing data and instructions between and among the network of radios. The mesh network permits data to be efficiently transmitted from one radio in the network to the next until the data reaches a desired destination.

The mesh network may be implemented over a wireless network or partially wireless network. Each sensor node having a radio within the network may function as a repeater that transmits data received from adjacent sensor nodes having radios to other nearby sensor nodes that are within range. The coverage area of the mesh network may be increased by adding additional radios. As a result, a network may be established that may cover an area of desired size, such as a floor of a building or an entire building.

Each sensor node having a radio within the mesh network is typically only required to transmit data as far as the next sensor node having a radio within the network. Hence, if a sensor node having a wireless radio has a limited power supply, the reduction in the distance that each sensor node is required to transmit permits lower power level transmissions, which may extend the operating life of the on-board power supply.

A number of protocols may be used to implement the mesh network. The sensor nodes may implement a protocol that uses low data rates and low power consumption. As noted above, the mesh network may employ devices that use very small amounts of power to facilitate significantly increased battery or power supply life. In some situations, power supply life may be extended by minimizing the time that the radio device of the sensor node is "awake" or in normal power using mode, as well as reducing the power at which a signal is transmitted.

Alternatively, the sensor nodes having wireless radios may implement a protocol that uses moderate or high data rates and power consumption. For instance, the sensor nodes may implement IEEE 802.11 protocols. An IEEE 802.11 LAN may be based on a cellular architecture where the system is subdivided into cells, where each cell is controlled by a base station. Other protocols may be implemented.

Additionally, by reducing the distance between sensor nodes, each sensor node having a wireless radio may be able to transmit signals at a reduced power level, which may extend the life of a power supply while the signals transmitted remain strong enough to reach an adjacent sensor node having a radio. The sensor nodes within the network may be synchronized such that each sensor node talks or listens at a particular time. Alternatively, one or more control radios may be generally active, while the remaining radios remain predominantly passive. The control radios may be hardwired directly to a power supply such that they are not confined by a limited power supply.

The mesh network may utilize the Zigbee protocol or other IEEE 802.15.4 Low-Rate Wireless Personal Area Network (WPAN) standards for wireless personal area networking. Zigbee is a published specification set of high level communication protocols designed for use with small, low power digital radios based upon the IEEE 802.15.4 standard. Other IEEE 802.15 standards also may be implemented, including those using Bluetooth or other WPAN or WLAN protocols or any other protocol.

The mesh network of sensor nodes may employ a dynamic routing algorithm. As a result, the mesh network may be self configuring and self mending. Each sensor node within the network may be able to identify neighboring sensor nodes. After receiving a message, a receiving sensor node may determine that it is not the sensor node closest to the destination and/or that it should not relay the message to another sensor node based upon the currently known configuration of operating sensor nodes. The receiving sensor node may wait a predetermined period and listen for another sensor node with a radio to relay the message. If after a predetermined time, the sensor node determines that the message has not been relayed as expected, the receiving sensor node may transmit or relay the message to a nearby sensor node.

By transmitting messages to only reach nearby or adjacent sensor nodes in the network, the messages within the network may be transmitted at lower power. The low power transmission requires less energy from the on-board power supply of each sensor node. Additionally, the low power transmissions by the sensor nodes prevent one message from occupying the entire network and permits messages to be simultaneously transmitted from different sensor nodes and travel throughout the network of sensor nodes in parallel.

IX. Exemplary Sensor Nodes

Figure 4:
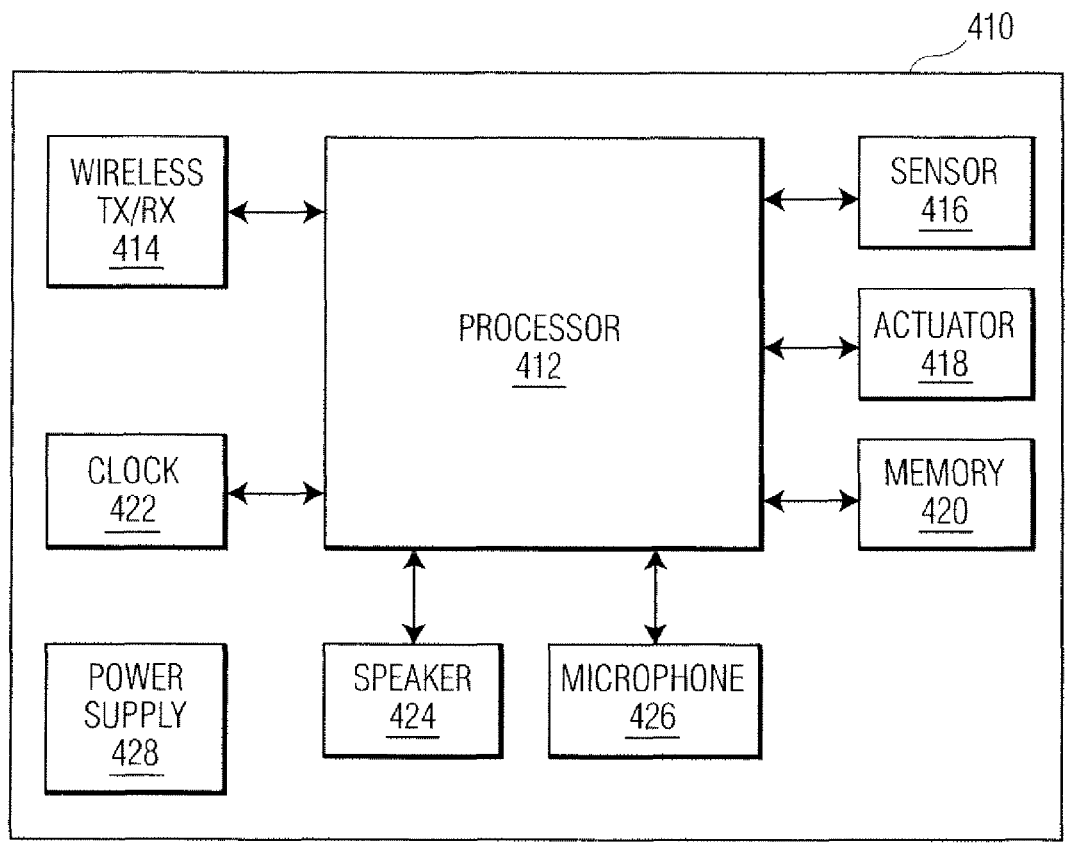
FIG. 4 is a block diagram of an exemplary sensor node.

FIG. 4 illustrates an exemplary sensor node or wireless radio 410. The sensor node 410 includes a processor 412, a wireless radio frequency transmitter and/or receiver 414, a sensor 416, an actuator 418, a memory 420, a clock 422, a speaker 424, a microphone 426, and an on-board power supply 428. The sensor node 410 may include additional, different, or fewer components.

For example, the sensor node 410 may be free of the sensor 416, actuator 418, memory 420, clock 422, speaker 424, the microphone 426, and/or power supply 428. The sensor node 410 may include the processor 412 and the wireless transmitter and/or receiver 414. For instance, the sensor node 410 may comprise the processor 412, the wireless radio frequency transmitter and/or receiver 414, the sensor 416, the actuator 418, and the power supply 428. Or the sensor node 410 may comprise the processor 412, the wireless radio frequency transmitter and/or receiver 414, the sensor 416, and the power supply 428. The sensor node 410 may include other combinations employing additional, different, or fewer components.

In one embodiment, the sensor node 410 may be operable to automatically control building equipment and locate movable items within a building. In another embodiment, the sensor node 410 may be portable, such as in the case of being mounted upon a movable item, or affixed at a specific location or to an immovable item. The sensor node 410 may be a controller, actuator, sensor, locator or other device in a security, fire, environment control, HVAC, lighting, or other building automation system. The sensor node 410 may determine its present location, sense conditions within a building, report conditions within a building, generate a signal representative of a building condition, and/or respond to an interrogator. The sensor node 410 also or alternatively may actuate building control components. As a controller, the sensor node 410 may be free of the sensor 416 and/or the actuator 418. In another embodiment, the sensor node 410 is a wireless device free of wired connections to other devices making the sensor node 410 self-contained and/or portable.

The sensor 416 may be a single sensor or include multiple sensors. The sensor 416 may be a temperature, pressure, humidity, fire, smoke, occupancy, air quality, flow, velocity, vibration, rotation, enthalpy, power, voltage, current, light, gas, $CO_2$, CO, $N_2$, $O_2$, chemical, radiation, fluid level, tank level, motion, Global Positioning System (GPS), infrared, or other sensor or combination thereof. The sensor 416 also may be a limit or proximity switch. Alternate sensors may be used.

The sensor 416 may be a motion sensor that detects when a portable sensor node 410 is moving. If it is sensed that the sensor node 410 is moving, the processor 412 may wake the sensor node 410 up from a sleep mode that draws less energy from the power supply 428. Upon waking up, the sensor node 410 may transmit via the wireless transmitter 414 to the network a message indicating that sensor node 410 is moving.

The sensor 416 may be motion sensor that detects when there is movement within a predetermined distance. For example, the sensor 416 may be wall mounted to detect when an individual has entered a specific building area. If the building area was previously unoccupied, the sensor node 410 on which the sensor 416 is mounted may transmit a message to the network that the building area is no longer unoccupied. As a result, the network may direct that the environmental conditions be altered accordingly, such as increase the temperature during cold weather, decrease the temperature during hot weather, turn on one or additional lights, or adjust the room to the individual's personal preferences.

The sensor 416 may be a GPS unit capable of receiving GPS signals and determining the location of the sensor node 410. The GPS unit may be able to determine the latitudinal and longitudinal coordinates, as well as the elevation, of the sensor node 410. The location of the sensor node 410 determined by the GPS unit may be subsequently transmitted to the network via the wireless transmitter 414.

The actuator 418 may be a single actuator or include multiple actuators. The actuator 418 may be a valve, relay, solenoid, speaker, bell, switch, motor, motor starter, turbine generator, motor generator, diesel generator, pneumatic device, damper, or pump actuating device or combinations thereof. For example, the actuator 412 may be a valve for controlling flow of fluid, gas, or steam in a pipe, or a damper controlling or redirecting air within an air duct. As another example, the actuator 412 may be a relay or other electrical control for opening and closing doors, releasing locks, actuating lights, or starting, stopping, and shifting motors and pumps. As a further example, the actuator 412 may be a solenoid that opens or closes valves, dampers, or doors, such as for altering the flow of fluid or air within piping or ducting. Alternate actuating devices also may be used.

The sensor node 410 may function as a controller or base station. The controller may be positioned at either a known or an unknown location. As a controller, the sensor node 410 interacts with other sensor nodes 410 for control or reporting functions.

The processor 412 is capable of processing data and/or controlling operation of the sensor node 410. The processor 412 may be a general processor, digital signal processor, application-specific integrated circuit (ASIC), field programmable gate array, analog circuit, digital circuit, network of processors, programmable logic controller, or other processing device. The processor 412 may have an internal memory.

The sensor node 410 also may have a memory unit 420 external to the processor 412. The memory unit 420 may store data and instructions for the operation and control of the sensor node 410, such as discussed herein. Additional or alternate types of data also may be stored in the memory unit 420.

A program may reside on the internal memory or the memory unit 420 and include one or more sequences of executable code or coded instructions that are executed by the processor 412. The instructions may include monitoring a signal associated with radio frequency energy being harvested via a crystal radio receiver, the radio frequency energy being used to at least partially power a sensor node. The instructions also may include automatically reducing the amount of power being expended by the sensor node if the magnitude of the signal monitored approximately reaches or falls below a threshold level. The instructions may include directions to accomplish other functionality described herein.

The program may be loaded into the internal memory or memory unit 420 from a storage device. The processor 412 may execute one or more sequences of instructions of the program to process data. Data may be input to the data processor 412 with a data input device and/or received from a network. The program and other data may be stored on or read from machine-readable medium, including secondary storage devices such as hard disks, floppy disks, CD-ROMS, and DVDs, or other forms of machine readable medium, either currently known or later developed.

The processor 412 is capable of directing the transmission or reception of data by the wireless transmitter or receiver 414, the speaker 424 or the microphone 426. For example, the processor 412 may direct the acoustic speaker 424 to transmit an ultrasound signal. The processor 412 may also direct the microphone 426 to receive an ultrasound signal and determine a distance from another device as a function of the received signal. Alternatively or additionally, the processor 412 may direct the wireless transmitter or receiver 414 to transmit data for determining the distance. Additionally or alternatively, the wireless transmitter 414 transmits a determined distance or distances as well as data regarding the processes and operation of the sensor 416 and/or the actuator 418.

The wireless transmitter and receiver 414 or the speaker 424 may be alternate wireless transmitters capable of transmitting a signal for distance determination. Similarly, the wireless receiver 414 and microphone 426 may be alternative wireless receivers capable of transmitting a signal for distance determination.

Figure 5:
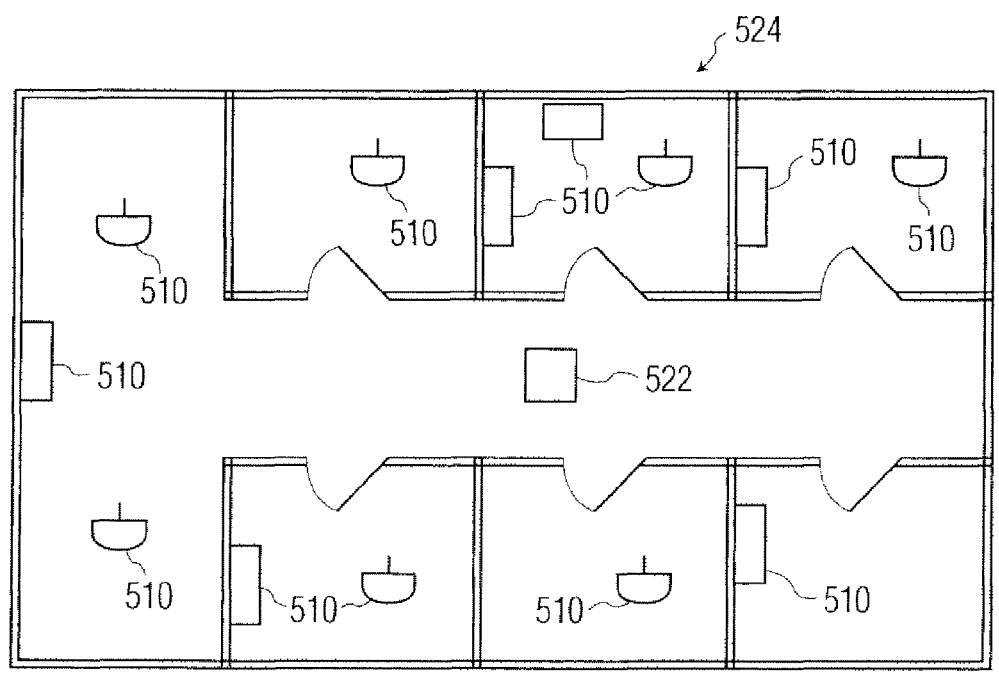
FIG. 5 is a top plan view of an exemplary network of sensor nodes within a building.

FIG. 5 illustrates a floor layout for a network of sensor nodes having wireless radios 510 operating with one or more control radios 522 within a building 524. The sensor nodes 510 may be dispersed throughout the building 524. One or more of the sensor nodes 510 may be located in each room or other building area. Alternate dispersed arrangements of the sensor nodes 510 may be provided. While one control radio 522 is shown, a plurality of control radios 522 may be provided in other embodiments. Additional, different or fewer sensor nodes 510 and control radios 522 may be provided. While shown as a single floor of a building 524, the network of sensor nodes 510 and control radios 522 may be distributed over multiple floors, a portion of the floor, a single room, a house, a structure, or any other building 524 or portion thereof.

The various sensor nodes 510 may be of the same configuration or a different configuration than each other. For example, some of the sensor nodes 510 may correspond to sensor arrangements, while other sensor nodes 510 may correspond to actuator arrangements. The same or different communication device, such as a wireless radio frequency transmitter and/or receiver, may be provided for each of the sensor nodes 510. Alternatively, different communications mechanisms and/or protocols are provided for different groups of the sensor nodes 510. The sensor nodes 510 may operate in an integrated manner for implementing one or multiple types of building automation control. Alternatively, different networks may be provided for different types of building automation, such as security, HVAC, heating, ventilation, and fire systems.

The sensor nodes powered by RF energy as discussed herein may be useful for a wide variety of applications, in addition to the building control functionality described above. For instance, the applications may include environmental and human body monitoring to military surveillance, building automation, and industrial monitoring. Each sensor node may facilitate one or more control, homeland security, reconnaissance, or other tasks. In one embodiment, the sensor node may be implanted internally within a patient, and sense and transmit data pertaining to a biological characteristic of the patient. The sensor nodes may be used for other applications.

X. Exemplary Method

Figure 6:
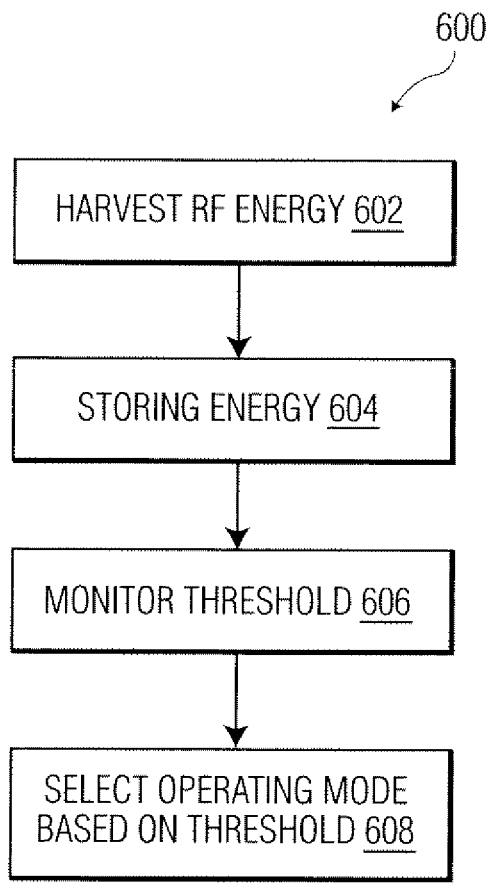
FIG. 6 illustrates an exemplary method of harvesting radio frequency energy.

FIG. 6 illustrates an exemplary RF energy harvesting method. The method may include harvesting RF energy 602, storing the RF energy harvested 604, monitoring a signal associated with the RF energy harvested 606, and selecting an operating mode based upon the level of the signal monitored 608. The method may include additional, fewer, or alternate actions.

The method may include harvesting RF energy 602. RF energy may be harvested via a crystal radio receiver as discussed herein. Most of the energy harvested may be scavenged from AM radio signals. The RF energy may be harvested ubiquitously. The RF energy may be used to primarily or solely power a self-contained sensor node.

The method may include storing the RF energy harvested 604. The RF energy or an associated signal may be measured from a super capacitor or other energy storage means. In one aspect, the RF energy harvestor may be used in unison with another type of energy harvester, such as a solar, biomechanical, thermoelectric, or vibration driven device.

The method may include monitoring a signal associated with the RF energy 606. A voltage on the super capacitor may be monitored. Other signals related to the RF energy harvested also may be monitored.

The method may include selecting an operating mode based upon the level of the signal monitored 608. The operating mode selected may relate to power constraints imposed upon the sensor node. If the level of the signal being monitored, such as a voltage signal or other signal, falls below a threshold level, the sensor node may be directed to operate in a low power mode, as discussed herein, to conserve energy until the amount of RF energy being harvested returns to a self-sustaining level with respect to the operating power requirements of the sensor node.

XI. Exemplary Method

FIG. 7 illustrates an exemplary interrupt handling method 700. The method 700 may be implemented by software on the sensor node. As shown, the method 700 may use a state variable K having 2 states. When K=1, the power switch in FIG. 2a may connect pin A to pin Out, which in turn is connected to the pin labeled VCC. The voltage of pin VCC, which is connected to the sensor node, is equal to the output voltage of the DC/DC converter. Thus, in this case, the sensor node is powered through the energy harvester via the super capacitor and DC/DC converter. On the other hand, when K=2, the power switch connects pin B to pin Out and in this case, the sensor node is powered by the battery.

Ts in FIG. 7 is the wake-up period (which is configurable through software depending upon the application). The sensor node wakes up repetitively with time period of Ts. Each time when the sensor node wakes up, it may sense the environment, process the data, and transmit the date to the sink, if necessary. Then the sensor node may enter sleep mode, which costs almost no energy.

Tm in FIG. 7 is the maximum wake-up period allowed by the system. If Ts>Tm, the wake-up period is longer than the upper limit required by the system. Thus, the sensor node cannot provide spontaneous samples to satisfy the quality of service (QoS) requirements of the network.

Tp in FIG. 7 denotes a continuous block of time during which harvested energy is enough to support the continuous operation of the sensor node to execute for a time Te, which is the minimum time required by a sensor node to complete sensing tasks as required by an application. In other words, each time the sensor node wakes up, it may have to execute for at least a period of Te. And the sensor node may have to make a decision as to whether it powers itself from the energy harvester or through the battery for this amount of time. The following brief analysis is presented to describe the novel sensor node operation that may be facilitated through the energy harvesting circuit.

Let the capacity of the super capacitor be represented by C. Then, the instantaneous energy E stored in the super capacitor is given by:

$$E = \tfrac{1}{2} C V_1^2.$$

If power rating of the sensor node is P, then the following equation holds $$E + D'T_p = PT_e,$$

where E' is the derivative of E with respect to time Thus, $$T_p = \frac{PT_e - E}{E'}$$

$$= \frac{PT_e - \tfrac{1}{2}CV_1^2}{CV_1 V_1'},$$

where $V_1'$ is the derivative of V1 and $V_1'$ can be estimated in practice by taking the difference of the V1 values at consecutive time intervals.

The flow chart shown in FIG. 7 may be described as follows. After receiving the interrupt 702, the sensor node sends a control signal to the power switch such that the sensor node is powered through the battery 704, since the energy on the capacitor may be depleted soon. The voltages V1 and V2 are measured by the sensor node 706. Tp is also computed based on V1 708, as shown in the above equation.

V2 is checked to see if it is low 710. If it is, then all of the energy is going to be depleted soon. Recall that when the interrupt occurred, V1 is already low. Thus, in this case, neither the energy harvester nor the battery can power the sensor node. The sensor node must take emergency actions, such as backup data 712 and notify its neighbors 714. Finally, the sensor node sets Ts to be equal to Tp 716, as well as sets K to 1 718. The rationale being that since the energy in the battery is going to be depleted soon, the node should wait in sleep mode 732 until enough energy has been harvested by the RF energy harvester.

When V2 is not low, the decision is based on V1. If V1 is low such that Tm≤Tp 720, which means that the energy harvester cannot satisfy the sensor node energy requirements, then the sensor node once again has no choice but to use power from the battery source. Since there is enough battery energy (recall that V2 is not low), the sensor node can be powered by the battery 728 through the current wake-up period Ts 726. The neighbors also may be notified 730. However, note that the energy from the harvester can still be used to charge the battery through the DC/DC converter. Thus, the system still benefits from the energy harvester even though the node is not powered directly by the energy harvester.

If V1 is high enough to support the minimal energy requirements of the sensor during its wake-up period, i.e., Tm>Tp, then the sensor node can increase its wake-up period. In this case, Ts is set to be Tp 722 and the sensor node is powered by the energy harvester through the DC/DC converter 724.

To summarize, the embodiments discussed herein facilitate the following complex sensor node behaviors: (1) switching the operating mode on the sensor node, such as standby or sleep modes; (2) sending a notification message to a sink via other sensor nodes; (3) saving important data to the flash memory on the sensor node, in case it is lost; (4) changing a sampling rate and transmission rate, and reducing the rates according to the voltages V1 and V2, (5) adjusting an energy weighting factor in the network routing metric (if the voltages of the sensor node are not high enough, the use of this node as a router to route other wireless message packets is minimized or avoided), and (6) switching the input power source from the RF energy harvester to a battery.

The methods and systems discussed herein may use one, two, or more antennas. If two antennas are used, one antenna may be dedicated to the sensor node or communications unit, and the other antenna may be dedicated to the RF energy harvesting system, such as shown in the Figures. As both the sensor node and the energy harvester each may have their own dedicated antenna, switching a single antenna between the sensor node and the energy harvester may be alleviated.

The operational mode of the harvesting system and/or the sensor node may be switched by the sensor node itself. Additionally or alternatively, the RF energy harvester discussed herein may trigger the sensor node and provide voltage measurements. For energy conservation purposes, the harvesting system discussed herein may not switch operation modes based on RF signals.

Therefore, the RF energy harvesters described herein may be directly connected to sensor nodes, purely passive and not needing to pass FCC requirements, and/or based on a bandpass or all pass filter for ubiquitous and wide spectrum RF energy harvesting. The systems discussed herein may facilitate advanced sensor behaviors. The system modes (active, standby and sleep) may be triggered by an interrupt signal and controlled by the sensor node, as compared to altering the operating mode according to received RF signals. The designs of the energy harvesting antenna may be different from known antennas. A super capacitor and/or a DC/DC converter may be employed by the energy harvester. Based on efficiency, size, and costs, the DC/DC converter may be provide benefits as compared to transformers. A buffered energy storage system may be constructed by the super capacitor and one or more rechargeable batteries. The harvesting system may improve battery life time.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments, and have a wide variety of applications including integrated building control systems, environmental control, security detection, communications, industrial control, power distribution, and hazard reporting.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A method of passive radio frequency energy harvesting, the method comprising:
   harvesting radio frequency energy using a crystal receiver;
   powering a processing unit only from the radio frequency energy being harvested when the radio frequency energy being harvested, or an indication of the amount of radio frequency energy being harvested, is above a threshold level;
   generating an interrupt signal to switch the processing unit to a low power mode when the radio frequency energy being harvested, or the indication of the amount of radio frequency energy being harvested, falls below the threshold level; and alternatively powering the processing unit only from an on-board power source when the radio frequency energy being harvested, or the indication of the amount of radio frequency energy being harvested, is below the threshold level.

2. The method of claim 1, wherein the crystal receiver employs an antenna that is fabricated from printed circuit board.

3. The method of claim 1, wherein the radio frequency energy harvested is increased by a super capacitor before being used to power the processing unit.

4. The method of claim 1, wherein the on-board power source is a battery or a capacitor.

5. The method of claim 1, wherein the crystal receiver employs a ferrite coil antenna.

6. The method of claim 1, wherein the radio frequency energy is harvested ubiquitously.

7. A method of passive radio frequency energy harvesting, the method comprising:

harvesting radio frequency energy using a crystal receiver;

powering a processing unit only from the radio frequency energy being harvested when the radio frequency energy being harvested, or an indication of the amount of radio frequency energy being harvested, is above a threshold level, wherein the processor unit is a self-contained sensor node operable to direct the operation of building equipment to control an environment of a building;

generating an interrupt signal to switch the processing unit to a low power mode when the radio frequency energy being harvested, or the indication of the amount of radio frequency energy being harvested, falls below the threshold level; and alternatively powering the processing unit only from an on-board power source when the radio frequency energy being harvested, or the indication of the amount of radio frequency energy being harvested, is below the threshold level.

8. The method of claim 7, wherein the processor unit has power requirements of greater than 10 milliwatts.

* * * * *